(12) United States Patent
Reynolds

(10) Patent No.: US 6,293,086 B1
(45) Date of Patent: Sep. 25, 2001

(54) POWER GENERATION EQUIPMENT

(75) Inventor: Graham A Reynolds, Coventry (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/520,620

(22) Filed: Mar. 7, 2000

(30) Foreign Application Priority Data

Mar. 23, 1999 (GB) .................................................. 9906620

(51) Int. Cl.$^7$ ................................. F02C 1/06; F02C 7/08
(52) U.S. Cl. .................... 60/39.161; 60/39.5; 60/39.511; 60/39.54; 60/39.55
(58) Field of Search ............................ 60/39.07, 39.161, 60/39.5, 39.511, 39.53, 39.54, 39.55

(56) References Cited

U.S. PATENT DOCUMENTS

| | | | |
|---|---|---|---|
| 4,248,039 | * | 2/1981 | Cheng ................................. 60/39.05 |
| 4,509,324 | * | 4/1985 | Urbach et al. ...................... 60/39.17 |
| 6,148,602 | * | 11/2000 | Demetri ............................... 60/39.05 |
| 6,223,523 | * | 5/2001 | Frutschi ............................... 60/39.05 |

* cited by examiner

*Primary Examiner*—Charles G. Freay
(74) *Attorney, Agent, or Firm*—W. Warren Taltavull; Manelli, Denison & Selter PLLC

(57) ABSTRACT

Power generation equipment (10) comprises a compressor (11,12) into which finely dispersed water is directed. Air compressed by the compressor (11,12) is directed into combustion equipment (13) where it is mixed with steam and fuel before combustion takes place. The resultant combustion products pass through two turbines (14,15), the second of which (15) is a power turbine. The exhaust efflux from the power turbine (15) is then cooled to such an extent that its pressure falls to below atmospheric pressure. The carbon dioxide is removed from the efflux by means of a sequestration membrane (33) before the pressure of the efflux is raised to above atmospheric pressure by a further compressor (16) driven by the power turbine (15). The equipment (10) is very efficient and produces low levels of pollution.

11 Claims, 1 Drawing Sheet

POWER GENERATION EQUIPMENT

FIELD OF THE INVENTION

This invention relates to power generation equipment and is particularly concerned with power generation equipment that is highly efficient and discharges reduced amounts of pollutants into the atmosphere.

BACKGROUND OF THE INVENTION

Conventional power generation equipment relying on the combustion of a suitable carbon-based fuel usually produces pollutants, the majority of which are in the form of the oxides of nitrogen and carbon dioxide. There is pressure to reduce the levels of these pollutants to levels at which they do not present a hazard to the environment and desirably to eliminate them completely.

SUMMARY OF THE INVENTION

It is an object of the present invention to achieve this end and to provide power generation equipment having enhanced efficiency.

According to the present invention, power generation equipment comprises air compression equipment, means to inject finely dispersed water into the air intake of said air compression equipment, combustion equipment for mixing air compressed by said air compression equipment with a suitable fuel and supporting the combustion of that mixture, turbine equipment to receive and be driven by the exhaust products of said combustion and in turn to drive said air compression equipment, power turbine equipment to receive and be driven by the exhaust efflux of said turbine equipment, heat exchange equipment positioned to receive the exhaust efflux of said power turbine equipment and place that exhaust efflux in heat exchange relationship with water to thereby cool that exhaust efflux and generate steam from said water, means to substantially remove carbon dioxide from the efflux exhausted from said heat exchange equipment and additional compression equipment driven by said power turbine equipment and positioned to receive and compress the exhaust efflux from said carbon dioxide removal equipment, said steam generated from said water in heat exchange relationship with said turbine exhaust efflux being directed to said combustion equipment to enhance the combustion process sustained thereby.

Said compression equipment preferably comprises first and second compressors in flow series relationship.

Said finely dispersed water is preferably injected into the intakes of each of said first and second compressors.

An intercooler may be interposed between said first and second compressors in flow series relationship therewith, said intercooler being adapted to provide said water injection into the intake of said second compressor.

Some of said generated steam may be directed into the intake of said turbine equipment.

Some of said steam may be additionally injected into the intake of said power turbine.

The exhaust efflux from said power turbine may be sequentially passed through a superheater, an evaporator, an economiser and a cooler in order to reduce the temperature of said exhaust efflux.

Water may be sequentially passed through said cooler, economiser, evaporator and superheater to place said water in heat exchange relationship with said exhaust efflux and thereby generate said steam.

A recuperator may be positioned immediately downstream of said power turbine.

Water may be passed through said recuperator to place said water in heat exchange relationship with the exhaust efflux of said power turbine to thereby generate said steam.

A cooler may be positioned downstream of said recuperator.

Said carbon dioxide removal means may comprise a sequestration membrane.

BRIEF DESCRIPTION OF THE DRAWINGS

The present invention will now be described, by way of example, with reference to the accompanying drawings in which.

DETAILED DESCRIPTION OF THE INVENTION

Figure 1:
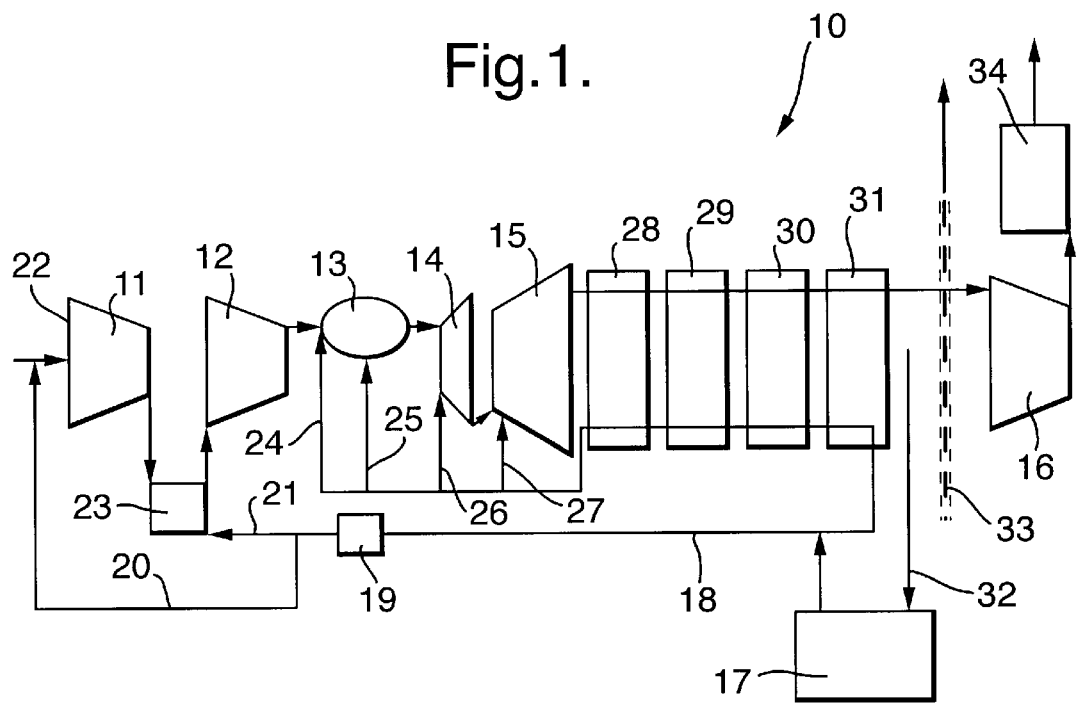
FIG. 1 is a schematic view of a first embodiment of power generation equipment in accordance with the present invention.

Referring to FIG. 1, power generation equipment generally indicated at 10 comprises, in axial flow series, first and second axial flow compressors 11 and 12, combustion equipment 13, an axial flow turbine 14 that is drivingly connected to the first and second compressors 11 and 12, a free power turbine 15 and an additional axial flow compressor 16 that driven by the free power turbine 15.

A water tank 17 is provided that is provided with means to treat and de-aerate the water contained within it. Clean and de-aerated water from the tank 17 is pumped to a line 18 where it is divided into two flows. The first flow is directed by the line 18 to a fog generation device 19 which serves to turn the water into a very fine dispersion, the individual particles of which are less than one micron in size. The dispersed water particles are then divided into first and second flows 20 and 21. The first flow 21 is directed to the intake 22 of the first compressor 11 where it is mixed with the air flowing into that compressor 11. The water serves to provide a significant reduction in the temperature of that air flow before it is compressed by the first compressor 11.

The air exhausted from the first compressor 11 is then directed into an intercooler 23 where it is mixed with the second flow of dispersed water particles 21. This serves to reduce the temperature of the air before it is directed into the second compressor 12 where further compression takes place. It will be appreciated, however, that the intercooler 23 is in fact an optional item and that there may be circumstances in which it is not necessary.

The compressed and cooled air exhausted from the second compressor 12 is then directed into the combustion equipment 13 where it is mixed with an appropriate carbon-based fuel such as a fuel oil or natural gas. Combustion of this mixture then takes place within the combustion chamber 13. In order to ensure that the combustion process is as efficient as possible, steam is directed into the combustion chamber 13 through two lines 24 and 25. The source of the steam will be explained later.

The steam from the line 24 is injected into the upstream region of the combustion equipment 13 in quantities appropriate to ensuring that the generation of the oxides of nitrogen by the combustion process are maintained at low levels or are substantially eliminated. Sufficient steam is also provided to provide adequate cooling of the combustion equipment 13.

The steam from the line 25 is directed into more downstream regions of the combustion chamber 13 in quantities appropriate to attainment of substantially complete combustion.

The high temperature combustion products from the combustion equipment 13 are then directed to drive the turbine 14. Steam is directed into the turbine 14 through a line 26 to mix with those combustion products and thereby provide cooling of the components of the turbine 14.

The exhaust efflux from the turbine 14 is then directed to drive the power turbine 15. More steam is directed into the power turbine 15 through a line 27 to mix with the combustion products and thereby bring about cooling of the power turbine 15 components.

The exhaust efflux from the power turbine 15 is then, in turn, passed through a superheater 28, evaporator 29, economiser 30 and cooler 31. The second flow of water from the line 18 is, in turn, passed through the cooler 31, economiser 30, evaporator 29 and superheater 28 so that it is placed in counter-flow heat exchange relationship with the exhaust efflux from the power turbine 15. This serves two purposes. Firstly the temperature of the water is raised to such an extent that it is converted to steam which is subsequently directed to the previously mentioned lines 24–27 to provide efficient combustion and turbine cooling. Secondly, it serves to reduce the temperature of the exhaust efflux from the power turbine 15 to around 300 degrees Kelvin. This, in turn, ensures that water vapour in that exhaust efflux (originating from previously added water mentioned earlier) is condensed. That condensed water is collected by conventional means and is returned to the water tank 17 through a line 32. Thus most of the water (around 95%) directed into to gas flow through the power generation equipment 10 is, after cleaning, de-aerating and treatment to remove such pollutants as carbonic acid, is recovered and recycled.

The cooled power turbine exhaust efflux is then directed through a conventional carbon dioxide sequestration membrane 33 which serves to remove substantially all carbon dioxide from the efflux.

The exhaust efflux after it has passed through the superheater 28, expander 29, economiser 30 and cooler 31 is at sub-atmospheric pressure. In order increase the pressure of that efflux, it is directed to the additional compressor 16. The additional compressor 16 raises the pressure of the efflux, whereupon the efflux is directed to atmosphere through an appropriate cleaning device 34.

By reducing the power turbine exhaust pressure to sub-atmospheric values, it is possible to take advantage of the differences in mass flow and specific heat of the turbines 14 and 15 and of the additional compressor 16 to enhance the overall efficiency of the power generation equipment 10.

Figure 2:
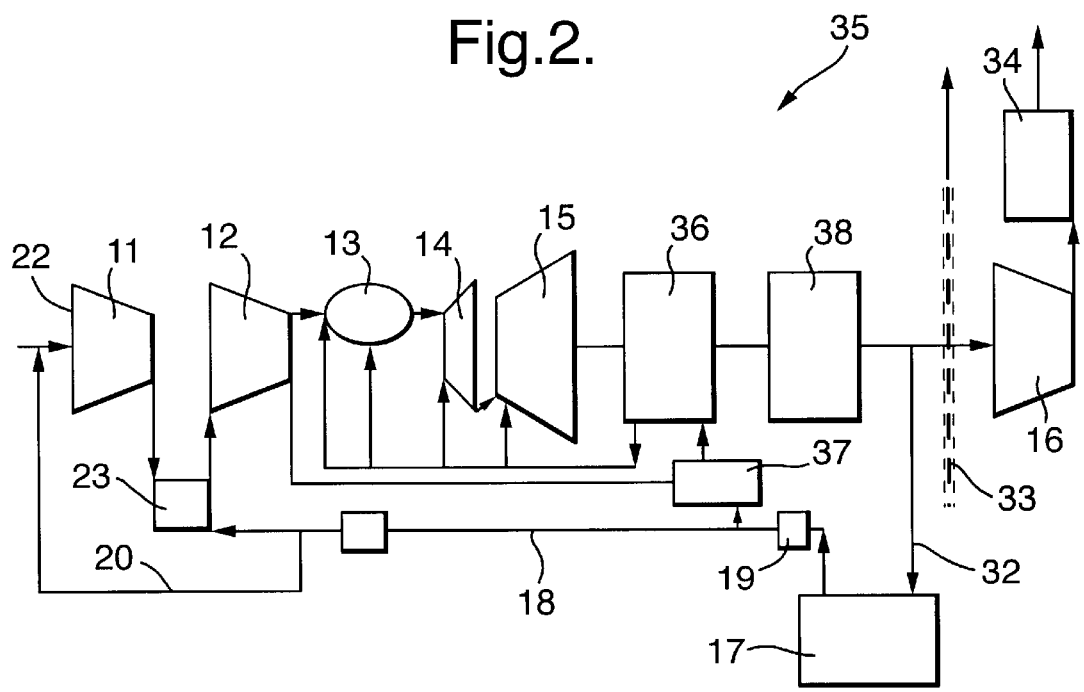
FIG. 2 is a schematic view of a second embodiment of power generation equipment in accordance with the present invention.

The second embodiment of the present invention 35 shown in FIG. 2 is similar in certain respects to that described above and shares several common components. Accordingly, common components are provided with common reference numerals.

Unlike the embodiment described above, the exhaust efflux from the second compressor 12 is not passed directly to the combustion equipment 13. Instead, it is passed to the combustion equipment 13 via a recuperator 36 that is positioned immediately downstream of the power turbine 15. The air exhausted from the second compressor 12 does, of course carry dispersed water that has been introduced into it by the intercooler 23. Consequently, the heat of the power turbine 15 exhaust efflux passing through the recuperator 36 converts that water to steam. Additional steam is generated from dispersed water from the line 18 that is directed into the recuperator 36 by an injection device 37. Thus the recuperator 36 receives dispersed water originating from the water tank 17 via two routes: one through the first and second compressors 11 and 12 and the second from the injection device 37. A small boiler (not shown) may be provided to ensure substantially complete conversion of the dispersed water to steam.

Thus the combustion equipment 13 receives air compressed by the first and second compressors 11 and 12 and steam dispersed therein.

The exhaust efflux from the power turbine 15, after it has passed through the recuperator 36 and has been cooled thereby, is then passed through a conventional cooler 38 that serves to reduce the temperature of the efflux further to approximately 300 degrees Kelvin. As in the previous embodiment, this is sufficient to achieve the condensation of substantially all of the steam in the efflux. The condensed water is then collected and returned to the water tank 17.

Thus the power generation device 35 is similar in concept to that of the previous embodiment differing only in the manner in which steam is generated and introduced into the combustion equipment 13 and the fact that the turbine 14 and the power turbine 15 are not cooled by the injection of additional steam into them. It does however, hold out the possibility of a less complicated, and therefore cheaper, steam generation system.

I claim:

1. Power generation equipment comprising air compression equipment, means to inject finely dispersed water into the air intake of said air compression equipment, combustion equipment for mixing air compressed by said air compression equipment with a suitable fuel and supporting the combustion of that mixture, turbine equipment to receive and be driven by the exhaust products of said combustion and in turn to drive said air compression equipment, power turbine equipment to receive and be driven by the exhaust efflux of said turbine equipment, heat exchange equipment positioned to receive the exhaust efflux of said power turbine equipment and place that exhaust efflux in heat exchange relationship with water to thereby cool that exhaust efflux and generate steam from said water, means to substantially remove carbon dioxide from the efflux exhausted from said heat exchange equipment and additional compression equipment driven by said power turbine equipment and positioned to receive and compress the exhaust efflux from said carbon dioxide removal equipment, said steam generated from said water in heat exchange relationship with said turbine exhaust efflux being directed to said combustion equipment to enhance the combustion process sustained thereby.

2. Power generation equipment as claimed in claim 1 wherein said compression equipment comprises first and second compressors in flow series relationship.

3. Power generation equipment as claimed in claim 2 wherein said finely dispersed water is injected into the intakes of each of said first and second compressors.

4. Power generation equipment as claimed in claim 2 wherein an intercooler is interposed between said first and second compressors in flow series relationship therewith, said intercooler being adapted to provide said water injection into the intake of said compressor.

5. Power generation equipment as claimed in claim 1 wherein some of said generated steam is directed into the intake of said turbine equipment.

6. Power generation equipment as claimed in claim 5 wherein some of said steam is additionally injected into the intake of said power turbine.

7. Power generation equipment as claimed in claim 1 wherein the exhaust efflux from said power turbine is sequentially passed through a superheater, an evaporator, an economiser and a cooler in order to reduce the temperature of said exhaust efflux.

8. Power generation equipment as claimed in claim 7 wherein water is sequentially passed through said cooler, economiser, evaporator and superheater to place said water in heat exchange relationship with said exhaust efflux and thereby generate said steam.

9. Power generation equipment as claimed in claim 1 wherein said carbon dioxide removal means comprises a sequestration membrane.

10. Power generation equipment comprising air compression equipment, means to inject finely dispersed water into the air intake of said air compression equipment, combustion equipment for mixing air compressed by said air compression equipment with a suitable fuel and supporting the combustion of that mixture, turbine equipment to receive and be driven by the exhaust products of said combustion and in turn to drive said air compression equipment, power turbine equipment to receive and be driven by the exhaust efflux of said turbine equipment, a recuperator positioned immediately downstream of said power turbine equipment to receive water and place the water in heat exchange relationship with the exhaust efflux of said power turbine to thereby generate steam, means to substantially remove carbon dioxide from the efflux exhausted from said recuperator and additional compression equipment driven by said power turbine equipment and positioned to receive and compress the exhaust efflux from said carbon dioxide removal equipment, said steam generated from said water in heat exchange relationship with said turbine exhaust efflux being directed to said combustion equipment to enhance the combustion process sustained thereby.

11. Power generation equipment as claimed in claim 10 wherein a cooler is positioned downstream of said recuperator.

* * * * *